United States Patent
Tronc et al.

(10) Patent No.: US 9,461,733 B2
(45) Date of Patent: Oct. 4, 2016

(54) DEVICE AND METHOD FOR OPTIMIZING THE GROUND COVERAGE OF A HYBRID SPACE SYSTEM

(75) Inventors: Jerome Tronc, Saint Jean (FR); Jean-Christophe Dunat, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 379 days.

(21) Appl. No.: 14/125,571

(22) PCT Filed: Jun. 13, 2012

(86) PCT No.: PCT/EP2012/061158
§ 371 (c)(1),
(2), (4) Date: Dec. 11, 2013

(87) PCT Pub. No.: WO2012/171937
PCT Pub. Date: Dec. 20, 2012

(65) Prior Publication Data
US 2014/0128059 A1   May 8, 2014

(30) Foreign Application Priority Data
Jun. 16, 2011 (FR) ...................................... 11 01853

(51) Int. Cl.
*H04B 7/185* (2006.01)

(52) U.S. Cl.
CPC ...... *H04B 7/18519* (2013.01); *H04B 7/18513* (2013.01); *H04B 7/18521* (2013.01); *H04B 7/18576* (2013.01)

(58) Field of Classification Search
CPC ......................................... H04B 7/185–7/2041
USPC ................ 455/12.1–13.3, 427–430; 370/316
See application file for complete search history.

(56) References Cited

U.S. PATENT DOCUMENTS

| | | | | |
|---|---|---|---|---|
| 3,618,097 | A * | 11/1971 | McLeod, Jr. ............ | H01Q 3/22 342/371 |
| 5,856,804 | A * | 1/1999 | Turcotte .................... | G01S 3/42 342/371 |
| 5,918,157 | A * | 6/1999 | Wiedeman ......... | H04B 7/18539 370/316 |
| 6,208,625 | B1 | 3/2001 | Zancho et al. | |
| 6,339,707 | B1 | 1/2002 | Wainfan et al. | |
| 6,452,534 | B1 * | 9/2002 | Zoratti ..................... | G01S 13/87 340/435 |
| 6,678,520 | B1 * | 1/2004 | Wang .................. | H04B 7/18513 455/13.1 |
| 2010/0303002 | A1 * | 12/2010 | Zorba Barah ...... | H04B 7/18534 370/316 |

FOREIGN PATENT DOCUMENTS

EP 0771085 A2 5/1997

* cited by examiner

*Primary Examiner* — Raymond Dean
(74) *Attorney, Agent, or Firm* — Im IP Law PLLC; C. Andrew Im

(57) ABSTRACT

A telecommunications system for intermittent data transfer from and to at least one user located substantially on the surface of a celestial body. The system comprises at least one surface transmitter/receiver terminal associated with each user, one or more signal repeater means for the signals transmitted and/or received from the surface terminals. Each moving repeater means has at least one antenna oriented toward the surface of the celestial body, and adapted to allow communications from and to surface terminals. Each antenna produces a transmission/reception beam, the track of which on the surface of the celestial body forms the ground track, the progressive sweeping of the surface by this ground track forming a strip called a swath.

16 Claims, 3 Drawing Sheets

| Mean elevation | 5° | 5° | 5° | 5° | 5° |
|---|---|---|---|---|---|
| Altitude of LEO satellite | 1100 Km | 800 Km | 600 Km | 500 Km | 400 Km |
| Earth radius | 6378 Km | 6378 Km | 6378 Km | 6378 Km | 6378 Km |
| Half angle of view of satellite | 58.17° | 62.27° | 65.58° | 67.48° | 69.62° |
| Radius of coverage at mean elevation | 1772 Km | 1522 Km | 1321 Km | 1206 Km | 1077 Km |
| Maximum delay Between GEO/LEO signals | 7.0 ms | 5.7 ms | 4.8 ms | 4.4 ms | 3.8 ms |

DEVICE AND METHOD FOR OPTIMIZING THE GROUND COVERAGE OF A HYBRID SPACE SYSTEM

RELATED APPLICATIONS

This application is a §371 application from PCT/EP2012/061158 filed Jun. 13, 2012, which claims priority from French Patent Application No. 1101853 filed Jun. 16, 2011, each of which is herein incorporated by reference in its entirety.

TECHNICAL FIELD OF INVENTION

The invention relates to the field of long-distance data transmission systems. More specifically, it relates to systems and methods for data communications (that is to say for data transfer, remote control, terminal monitoring, and the like) between users possessing small mobile terminals.

BACKGROUND OF THE INVENTION AND PROBLEM POSED

The problem of long-distance data transmission from or to a mobile terminal arises, in particular, in the case of links between computers (known as machine to machine links). This field of transmission is characterized by a data rate requirement which is markedly lower than that of image or Internet links, or alternatively by a capacity to use an intermittent link rather than a continuous one.

In this case, the satellite serves as a communications link between the two parties, and the latency time of acknowledgements and messages is a function of the distance between the satellite and the ground station (also known as the gateway Earth station, or GES).

However, the coverage provided by the network of ground stations of systems using low-orbit satellites such as Orbcomm (registered trademark) and Argos (registered trademark) is limited by the deployment of ground stations (GES), and the existing systems provide only a limited coverage of the Earth in this mode. In fact, each ground station allows coverage over a radius of about 3000 km, and each of these systems includes about twenty ground stations.

Clearly, therefore, the coverage areas include large "blank" areas in which the system cannot be used. These areas include, in particular, a large proportion of the oceanic regions, and even a significant part of continental regions such as Africa or Australia.

In cases where the LEO satellite has no simultaneous view of the user terminal and the ground control stations (GES), it is necessary to use a communications method of the type known to those skilled in the art as "store & forward". In this method, the message is stored on the satellite, which continues to travel in its orbit until it overflies the ground station GES to which it delivers the stored message.

With this method of operation, the call delays are long and create difficulties in making bidirectional calls in acceptable conditions, since the delays are typically between a few minutes and the 100 to 150 minutes required for a complete orbit of the LEO satellite.

There are also known examples of hybrid telecommunications systems for data transmission between users. A hybrid system of this type is composed of geostationary satellites and a constellation of low-orbit satellites.

Notably, a first patent document, FR 2764755/U.S. Pat. No. 6,208,625, may be cited: Method and apparatus for increasing call-handling capacity using a multi-tier satellite network This document describes a network formed by LEO and geostationary (GEO) satellites capable of communicating with each other. On the ground, user terminals can carry out reception/transmission (Rx/Tx) operations with the LEO and GEO satellites. The LEO component provides filtering of the traffic received from the terminals, and switches this traffic, as a function of the urgency of the traffic received, either internally toward the LEO system or toward the GEO system.

In a second patent document, EP 0883252/U.S. Pat. No. 6,339,707, entitled Method and system for providing wideband communications to mobile users in a satellite-based network, a satellite communications system is proposed for providing global coverage, reduced delay in transmission (Tx), and maximization of system capacity utilization (wideband satellite communications by the interconnection of a plurality of medium-orbit (MEO) and geostationary (GEO) constellations).

The MEO and GEO satellites communicate with each other directly by inter-satellite links, permitting traffic routing (for voice and data) on board the satellites according to certain rules.

This document also proposes spectrum sharing and re-use between the GEO and MEO satellites at very high frequencies (between 40 and 60 GHz, for example), to allow what is known as the "seamless handover" function for portable terminals (that is to say, switching from a mobile to a fixed network without interruption of the current call).

Clearly, the present hybrid systems have a high degree of complexity, with correspondingly high costs of installation and use.

The problem posed by this type of service is that it is desirable to offer a high-quality service at a very low price for users, implying a reduction in the cost of the system without degradation of its performance.

However, the price of the space segment in this type of system may be significant, especially if the satellites used are complex and/or numerous. It is therefore necessary to maximize the directivity and the link budget offered to users over the whole terrestrial surface while using satellites having the smallest possible degree of complexity.

OBJECTS OF THE INVENTION

An object of the invention is to provide a solution based on the simplest possible repeater satellites, offering good performance (in terms of link budget and availability) within the coverage of each satellite.

SUMMARY OF THE INVENTION

For this purpose, the invention proposes, in the first place, a telecommunications system intended for intermittent data transfer from and to at least one user located substantially on the surface of a celestial body, the system comprising:
at least one surface transmitter/receiver terminal REC associated with each user,
one or more signal repeater means for the signals transmitted and/or received from the surface terminals REC, these repeater means moving above the surface of the celestial body, each moving repeater means having at least one antenna oriented toward the surface of the celestial body and adapted to allow calls from and to surface terminals REC, each antenna providing a transmission/reception beam whose track on the surface of the celestial body forms the ground track, the progressive sweeping of the surface by this ground track forming a strip known as the swath, the system having means known as active track length reduction means, adapted to ensure that, at each point P of the swath of the moving repeater means, and on each pass of the latter, the total coverage time (along the line of movement) by at least one active antenna of the moving repeater means determines a length $L_{ac}(P)$ called the active communication length, whose mean value $L_{ac}$ over the width of the swath is markedly smaller than the width $l_f$ of said swath (along an axis perpendicular to the line of movement).

Throughout the present application, the expression "users located substantially on the surface" signifies, notably, users on the ground, at sea or in the air. Similarly, the surface terminals are considered to be placed, for example, in land, sea or air vehicles.

The expression "moving repeater means" signifies, notably but not exclusively, a satellite in low earth orbit (LEO).

The expression "total coverage time (along the line of movement) by at least one active antenna of the moving repeater means" signifies the total period of illumination of the ground terminal by the various antennas of the moving communication means.

A satellite data transmission mission for machine-to-machine applications (which are therefore necessarily intermittent) requires a detailed set of specifications which must be complied with when the payload complexity is reduced, namely:

The link budget of the satellite to be optimized
No requirement for continuous coverage over time
The need to minimize the revisit time (defined as the time between two overflights of the terminal by satellites of the constellation).

To meet the requirements of the mission, the present invention proposes to maximize the directivity of the satellite antenna while offering sufficient coverage to minimize the revisit time.

In an advantageous embodiment, the active track length reduction means comprises, for at least one moving repeater means, antennas oriented toward the ground, the beams of which are such that the length of each beam on the ground, equal to the active communication length in this case, is markedly smaller than the width of the swath (along the axis perpendicular to the movement).

More specifically, the aggregate ground track of the set of transmission/reception beams of the repeater means has a length, measured in the direction of movement of the moving means, which is less than its width, measured in a direction perpendicular to the direction of movement of the moving means.

Evidently, the beams are not necessarily aligned on the same line perpendicular to the line of movement, but may be offset with respect to each other along the direction of movement. However, the length of each beam is still much smaller than the width of the ground track. Thus, when viewed from each point on the ground, the length of the ground track is effectively much smaller than its total width, which may be equal to the width of the swath.

In an even more specific embodiment, the aggregate width of the ground track is greater than or equal to three times the length of said ground track.

Advantageously, the moving repeater means has an antenna whose beam forms an elliptical ground track having a width considerably greater than its length.

Alternatively, the moving repeater means has at least two antennas whose beams sweep adjacent areas of the swath, the aggregate ground track of the tracks of each beam having a width considerably greater than its length.

In another embodiment, the active track length reduction means comprise, for at least one repeater means, at least two antennas intended for calls toward the ground, and means for intermittently energizing each of these antennas.

In a preferred embodiment, the system comprises at least one linking ground station (GES) for a stationary means GEO which remains permanently in view of the same area of the ground. Communications between the ground and the space repeater means are provided by using stationary means GEO and linking stations GES for these stationary means GEO. These communications comprise data exchanges between users, as well as, potentially, remote control and remote measurement communications of the space repeater means. Consequently this embodiment does not require the use of a linking ground station assigned to the space repeater means.

In a preferred embodiment, at least one stationary means is placed on board a satellite in geostationary orbit around the celestial body.

Similarly, at least one repeater means is preferably placed on a low-orbit satellite moving around the celestial body.

In other words, the invention proposes, notably, a system for data communications over a distance between mobile terminals, the system using payloads on board one or more geostationary satellites and on board a constellation of satellites in low moving orbit, in which the satellites in moving orbit act as space repeaters for the signals transmitted to and/or received from the geostationary satellites.

In a preferred embodiment, the constellation of satellites in low moving orbit, acting as space repeaters, may be an LEO (Low Earth Orbit) constellation or alternatively an MEO (Medium Earth Orbit) constellation.

In an advantageous embodiment, at least one repeater means is placed on board a satellite traveling in a polar or quasi-polar orbit (with an orbit inclination of more than 70°) around the celestial body.

By using a polar orbit it is possible to improve the coverage of high-latitude areas which cannot be served in good conditions by a geostationary satellite.

In a second aspect, the invention proposes a telecommunications method intended for low-speed data transfer between two users located substantially on the surface of a celestial body, the first user being provided with a user terminal, in view of at least one repeater means, and the repeater means being in view of at least one stationary means, the method using a telecommunications system as disclosed, the method comprising, notably, steps in which:
the first user's terminal transmits a first uplink signal, representative of the data to be transmitted, toward the repeater means,
the repeater means receives and amplifies the first signal transmitted by the ground user terminal, and transmits it in the form of a second uplink signal toward the stationary means in the same frequency band, the stationary means providing correct final transmission of the data to be transmitted toward the second user.

The invention also proposes a telecommunications method intended for low-speed data transfer between two users located substantially on the surface of a celestial body, the second user being provided with a second user terminal, in view of at least one repeater means, and the repeater means being in view of at least one stationary means, the method using a telecommunications system as disclosed, the method comprising, notably, steps in which:

the stationary means retransmits a signal, representative of the data to be transmitted, received from the first user, toward the repeater means in the form of a first downlink signal, the repeater means receives and amplifies the first downlink signal transmitted by the stationary means, and transmits it to the terminal of the second user on the ground in the same frequency band, in the form of a second downlink signal.

Evidently, both parts of the method may be used in combination.

Preferably, the re-use of the frequencies between the different components of the communications system takes place in a coordinated manner to minimize the intra-system interference.

The invention also proposes a telecommunications method intended for intermittent data transfer from and toward at least one user located substantially on the surface of a celestial body, the user being provided with a user terminal, in view of at least one repeater means moving above the surface of the celestial body, the method using a telecommunications system as disclosed, the method comprising, in an iterative manner, the following steps:

100. choosing at least one antenna to be energized,
200. transmitting from or to the user terminal during a period called the illumination period,
300. de-energizing at least one antenna.

Preferably, in step 100, the choice of a beam to be energized is made in a regular manner during a time proportional to the number of antennas oriented toward the ground.

Alternatively, in step 100, the choice of a beam to be energized depends on the area being overflown by the satellite, according to a predetermined logic which is dependent on the type of area overflown.

In a specific embodiment, in step 200, the duration of the energized period varies according to a predetermined criterion.

Alternatively, the energized period is related to previously stored data on the call volume detected in each area on the ground during a previous period.

In a preferred embodiment, in step 200, only one antenna is energized at a time.

In an advantageous embodiment, the sequence of activated antennas follows a sweep in a predetermined direction before returning to the starting antenna when the last antenna of the swath has been energized.

In a variant embodiment, the sequence of activated antennas alternates between a wide antenna covering the whole angle of view of the satellite and antennas providing narrower beams.

In another variant, which may be used in combination, the method includes a step in which the widest beam is used when the moving repeater means is located above the polar areas of the celestial body, while the antennas providing narrower beams are used in the rest of the trajectory of the moving repeater means.

In other aspects, the invention proposes a repeater means and a user terminal for a communications system as disclosed.

Since the preferred or specific characteristics and the advantages of this repeater means and of this user terminal are identical to those of the system as disclosed briefly above, these advantages will not be discussed at this point.

BRIEF DESCRIPTION OF THE DRAWINGS

The purposes and advantages of the invention will be understood more fully on perusal of the description and drawings of a specific embodiment, provided by way of non-limiting example and represented by the drawings as shown below.

DETAILED DESCRIPTION OF AN EMBODIMENT OF THE INVENTION

Figure 1:
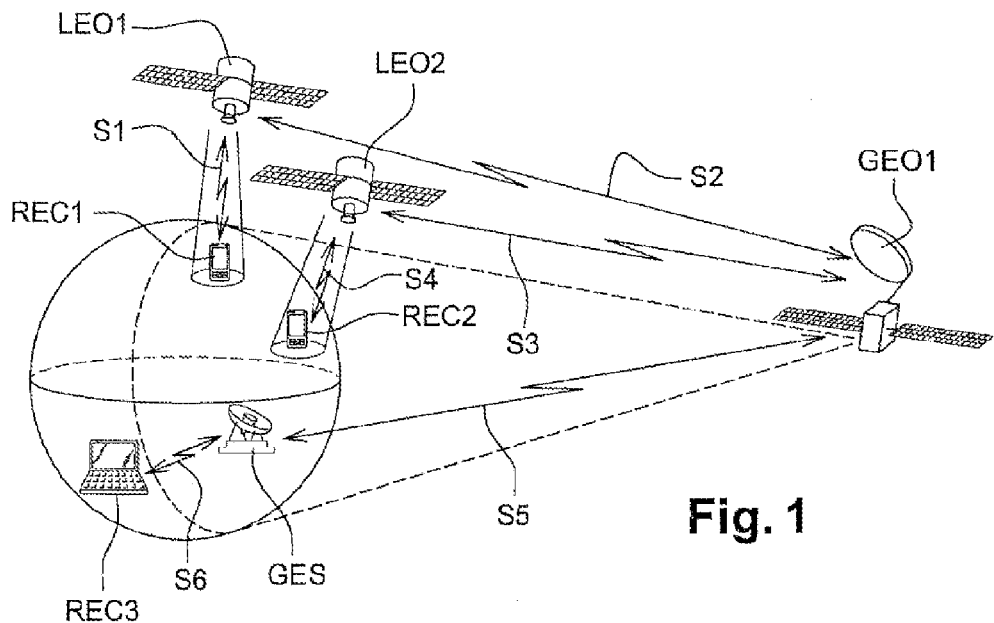
FIG. 1 shows the general architecture of the system.
Figure 2:
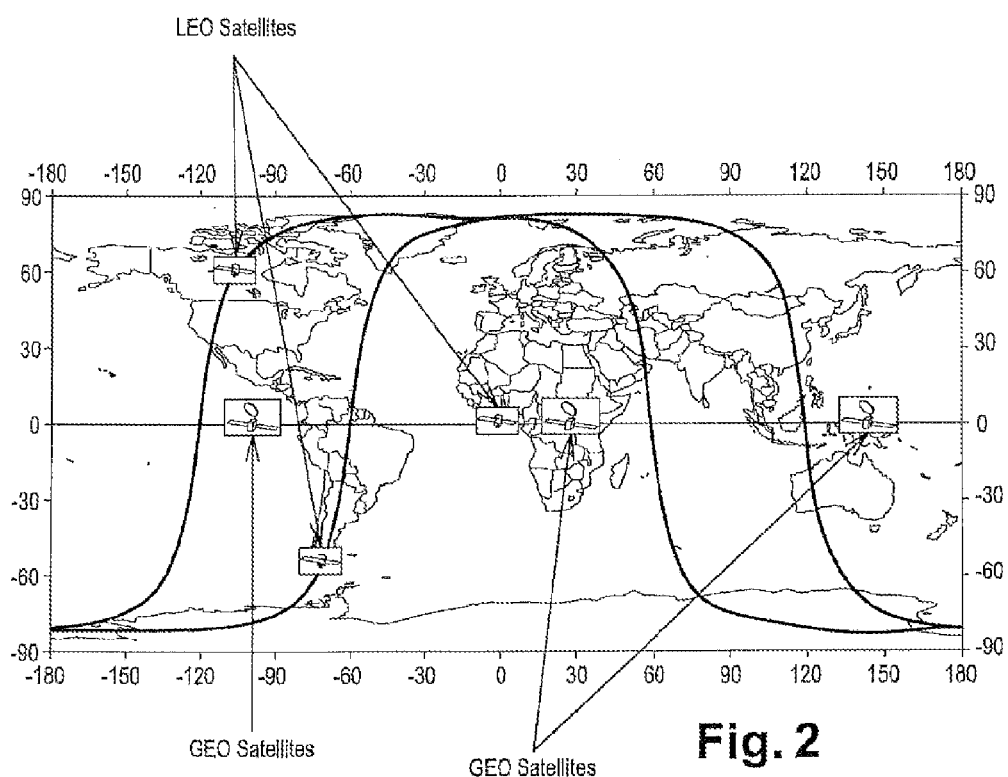
FIG. 2 is an illustration of the positions of the LEO and GEO satellites on a planisphere at a given instant.

The architecture of the system is shown in FIGS. 1 and 2. As can be seen in these figures, the proposed system uses two satellite constellations. The first constellation is composed of one or more geostationary satellites (also called GEO in the remainder of the description).

The system, described by way of an entirely non-limiting example, is based on a constellation of three geostationary satellites GEO1, GEO2, GEO3, placed in geostationary orbit above the three main continental areas (for example, at the longitudes of 265° E, 25° E, and 145° E respectively, as shown in FIG. 2). The geostationary satellites GEO1, GEO2, GEO3 operate in what is known as the MSS L-band (1.5/1.6 GHz).

The constellation of geostationary satellites GEO1, GEO2, GEO3 is tracked by one or more terrestrial tracking stations, positioned in view of the geostationary satellites GEO1, GEO2, GEO3 monitored by them, which perform tracking and remote control functions. The constellation of geostationary satellites GEO1, GEO2, GEO3 is connected to the terrestrial telecommunications networks by one or more terrestrial linking stations GES, positioned in view of the geostationary satellites GEO1, GEO2, GEO3, via a link FL (abbreviation for "Feeder Link"), in a known way.

The system is completed by a second constellation of three satellites moving in low or medium orbit (called LEO or MEO satellites), with orbits at altitudes typically in the range from 400 to 20000 km, acting as space repeaters. Evidently, the system may use a larger or smaller number of satellites in each of the LEO and geostationary constellations, the difference being a more or less complete coverage of the Earth.

In the example described here by way of non-limiting example, the moving satellites are assumed to be of the type moving in low orbit (known as LEO satellites), and are placed in heliosynchronous orbit at an altitude of 567 km with an inclination of 97.7° in three different orbital planes (with right ascensions of the ascending node at 0°, 60° and 120°). It will be recalled that the heliosynchronous orbit is defined by the fact that each satellite, after a number of orbits, passes in view of the same point on the Earth again at the same local solar time. The present system uses three satellites in low orbit: LEO1, LEO2, LEO3, the orbital tracks of which are shown in FIG. 2 by way of an entirely non-limiting example. In this example, these three satellites in low orbit, LEO1, LEO2, LEO3, may be payloads placed as "passengers" on satellites whose primary payload is dedicated to other missions such as Earth observation.

Evidently, the constellation of moving satellites LEO1, LEO2, LEO3, may comprise satellites traveling in orbits at different altitudes or inclinations.

These low-orbit satellites LEO1, LEO2, LEO3 operate in the same frequency band as the geostationary satellites GEO1, GEO2, GEO3, which in the present case is the MSS L-band (1.5/1.6 GHz).

The communication system is intended for any user, notably a mobile user, on the Earth's surface, provided with a transmission/reception terminal REC1 transmitting or receiving data from or to another user, which may itself be provided with a transmission/reception terminal REC2, and which may also be movable on the Earth's surface. The user REC3 may also be connected to a terrestrial network (IP, PSTN, . . . ) and may be connected to the user REC1 via the GES.

Each user terminal REC1 and REC2 is a transportable terminal, having, notably, a user interface, such as a keyboard, touch screen or data link to an electronic device, a battery and/or power supply means, a processor and/or an electronic control system, program or data storage means, and signal transmission and reception means, operating in the MSS L frequency band, in the present example which is described here in an entirely non-limiting way.

Each user terminal REC1 and REC2 is provided, in the present example, with an omnidirectional antenna, adapted to receive signals which may be emitted from any of the low-orbit satellites LEO1, LEO2, LEO3, or from any of the geostationary orbit satellites GEO1, GEO2, GEO3.

In the embodiment described here by way of example, each user terminal REC1 and REC2 includes, for the forward channel, a Rake receiver, well known to those skilled in the art. It will be recalled that a Rake receiver is a radio receiver, originally designed for compensating the attenuation due to multiple radio wave paths in terrestrial systems. It is based on the principle that the reflected signals can be distinguished (typically where a CDMA multiplexing method is used) and can thus be combined in a suitable way by taking advantage of the multiple propagation. For the return channel, the GEO satellites are assumed to be transparent, and the Rake receiver is positioned at the GES (linking stations of the GEO satellites).

However, it should be noted that, if the GEO satellites are of the regenerative type, they will have to carry a Rake receiver (replacing the receiver fitted at the GES).

A call between two user terminals REC1, REC2, assumed to be in view of two low-orbit satellites LEO1, LEO2 respectively, and of the same geostationary satellite GEO1, includes a plurality of steps, as shown schematically in FIG. 1:

the first user terminal REC1 transmits a first signal S1 toward the first low-orbit satellite LEO1,
the low-orbit satellite LEO1 receives and amplifies the signal S1 transmitted by the user terminal REC1 on the ground and transmits it in the form of a signal S2 toward the geostationary satellite GEO1,
the geostationary orbit satellite GEO1 receives the signal S2, and, if conditions permit, the signal S1, and retransmits them in the form of a signal S3 toward the second low-orbit satellite LEO2, either directly (using a routing system on board the satellite) or via the linking station GES. The signals S1 and S2 are processed by means of a Rake receiver located either on board (in the case of on-board routing) or at the GES station (this solution is preferred for reasons of simplicity of implementation),
the low-orbit satellite LEO2 receives and amplifies the signal S3 transmitted by the geostationary orbit satellite GEO1 and transmits it in the form of a signal S4 to the user terminal REC2 on the ground,
the user terminal REC2 receives the signal S4, and potentially the signal S3 if conditions permit. A Rake receiver can be used to recombine these two signals at the user terminal.

In a case in which there are user terminals in view of two different geostationary satellites GEO1, GEO2, the link between the two user terminals also includes a communication segment between these satellites, provided for example, but not exclusively, via the linking stations GES and the ground links, or via a direct link between GEO satellites, if this is present.

Evidently, it is also feasible to establish a call from a user REC1 having a mobile transmitter/receiver terminal to another user REC3 connected through a "conventional" terrestrial telecommunications network (PSTN, IP, etc.) via the linking station GES.

In this case, the first user terminal REC1 transmits a first signal S1 toward the first low-orbit satellite LEO1,
the low-orbit satellite LEO1 receives and amplifies the signal S1 transmitted by the user terminal REC1 on the ground and transmits it in the form of a signal S2 toward the geostationary satellite GEO1,
the geostationary orbit satellite GEO1 receives the signal S2, and potentially the signal S1, and retransmits them in the form of a signal S5 toward the linking station GES.
the linking station GES receives the signal S5 (combining the signals S1 and S2 contained in S5 by means of a Rake receiver if necessary), and transmits it in the form of a signal S6 to the user terminal REC3 on the ground via a conventional terrestrial network.

It should be noted that, in FIG. 1, the direct links between the user terminals REC1, REC2 and REC3 and the geostationary satellite GEO1 are not shown, in order to simplify the drawing.

Different approaches may be envisaged for the space repeater on board a low-orbit satellite LEO1, LEO2, LEO3:

Either, preferably, simple amplification, without frequency translation, of the signal received from the geostationary satellite GEO. However, this requires the use of an air interface capable of supporting the arrival of two signals having a number of differences in their delay and Doppler characteristics. This is the case, for example, with an air interface of the CDMA (Code Division Multiple Access) type associated with a Rake receiver.

Or, alternatively, the use of two separate signals (one for the GEO satellite and one for the LEO satellite). For example, it is possible to use an air interface of the TDMA (Time Division Multiple Access) type, which is known in itself, by providing either time-division multiplexing for sharing capacity between the LEO and GEO satellites (with guard spaces and Doppler precompensation at the LEO moving satellite), or the use of two subchannels (one for the GEO satellite and one for the LEO satellite).

In the embodiment described here by way of example, the first approach was chosen, because it offers a simple and effective solution.

In fact, it exploits the diversity of the satellites, since the signals arriving from both the LEO and GEO satellites can be combined in a Rake receiver to obtain a better signal to noise ratio. By using this method of improving the signal to noise ratio it is possible to achieve a lower bit error rate, a lower effective isotropically radiated power (EIRP), or a greater margin in the link budget.

Additionally, for a user terminal REC1, in view of a low-orbit satellite LEO1 and a geostationary satellite GEO1 simultaneously, if the propagation conditions cause the loss of a link to one of the satellites to which it is connected (because of the variation of the geometry of the link with the LEO which changes as a function of time, or because of obstacles in the line of sight of one of the two satellites LEO1 and GEO1), the other link can enable the call to continue.

This principle of simple amplification without frequency translation of the signal received from the GEO satellite can be implemented because the Rake receiver, included in the user terminal REC1, REC2, makes it possible to combine different signals from different paths originating from a low-orbit satellite LEO and a geostationary orbit satellite GEO.

In the scenario of satellite data communications to which the present embodiment relates, the multiple-path component is generally negligible. In this case, the Rake receiver is used simply to combine a plurality of direct signals sent from a plurality of LEO and GEO satellites, since the different signals can be considered as components of imaginary "multiple paths".

The received signals can then be combined in the user terminal REC1, REC2 according to the following three main algorithms, known to those skilled in the art and therefore not described further here: selection of the best signal (known under the term of "selection combining"), simple equal combination of the signals (known under the name of "equal gain combining"), or weighted recombination of the signals to maximize the total signal to noise ratio (known under the name of "maximal ratio combining"). The last of these algorithms (maximal ratio combining) is the preferred solution, since it has the best performance in terms of the resulting signal to noise ratio.

One of the essential problems of signal combination is that each channel followed may have a very different length because of the relative positions of the elements of the system, namely the user, the LEO satellite and the GEO satellite. In order to balance out the difference in propagation time, which also varies in time, appropriate data buffers must be provided in the Rake receiver. The design of these buffers depends on the time difference in the worst case between the different paths, and on the maximum data transfer rate used.

Figures 3, 4:
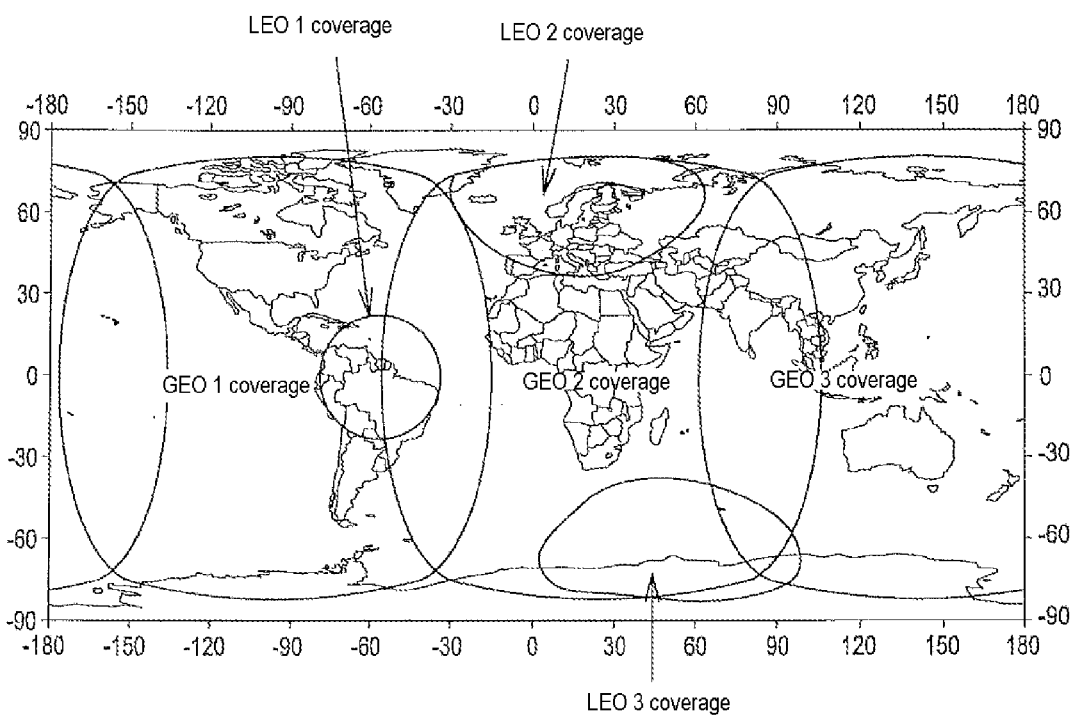
FIG. 3 is a table of the orders of magnitude of delays between the signals of a GEO satellite and a LEO satellite for LEO orbits at different altitudes.
FIG. 4 shows the coverage areas of the LEO and GEO satellites of the constellation that has been described.

In the proposed system, the time difference remains below 5 ms for the constellation of moving satellites LEO1, LEO2, LEO3 considered here. The table of FIG. 3 shows some orders of magnitude of times for different altitudes of LEO orbits relative to a GEO satellite.

It should also be noted that the communication services envisaged for the system according to the invention are transmissions at a low data rate. The size of the data buffer required therefore remains within reasonable limits.

With this approach using a Rake receiver, in the case of CDMA multiplexing, the LEO and GEO satellites share the same frequency band (the MSS L-band in the present example) without generating damaging interference.

Frequency planning and questions of coverage areas must also be taken into consideration, because the LEO and GEO coverage areas must be coordinated to ensure correct operation of the system. In the proposed approach, the coverage of the GEO satellites is composed of a global beam covering the whole visible surface of the Earth. This approach makes it possible to avoid or limit the transfer procedures for the LEO satellites (known to those skilled in the art as the "hand-over") between different beams originating from one or more GEO satellites. The LEO coverage is therefore included in the GEO coverage, as shown in FIG. 4. Thus the LEO satellites simply relay the signals of the GEO satellites under which they are located.

In the above example:
The LEO1 satellite relays the signals from and to the GEO1 satellite.
The LEO2 and LEO3 satellites relay the signals from and to the GEO2 satellite.
There is no LEO satellite in the coverage of the GEO3 satellite at the instant shown in FIG. 4. In fact, at this moment the LEO3 satellite is connected to the GEO2 satellite.

During the movement of one of the LEO satellites within the coverage area of the GEO satellites, it may be visible to different GEO satellites. However, it is assumed to be connected to a single geostationary satellite at any given instant. If there is more than one GEO satellite in the visibility area of the moving LEO satellites, various strategies may be adopted for the choice of the GEO satellites to which the LEO is to be attached (for example, according to the criterion of the best signal received at the LEO satellite, or a geometrical criterion of minimization of the distance between the LEO and GEO satellites, which can be predicted in advance from the satellite ephemerides). In the above example, the LEO satellite is connected to the GEO satellite supplying the best signal received.

Given these assumptions, there is no need to develop complex frequency planning strategies, and all the satellites (the three GEO satellites and the three LEO satellites) can operate, for example, on a single CDMA channel.

By contrast with the prior art used in Orbcomm (registered trademark) or Argos (registered trademark), the proposed system can provide bidirectional data communications, based on the fact that the GEO satellite relays the communications of the LEO satellites.

In this approach, as soon as the user terminal REC1, REC2 is in the coverage area of a moving satellite LEO1, LEO2, LEO3, it is possible to communicate bidirectionally and in real time with this terminal. There is no longer any need for the moving satellite LEO1, LEO2, LEO3 to have simultaneous visibility of the user terminal REC1, REC2 and of a ground connecting station, and therefore complete coverage of the Earth becomes feasible.

In this case, the delay in communication with a user terminal REC1 on the ground is solely a function of the passage frequency of the LEO1, LEO2, LEO3 satellites in moving orbit, which depends directly on the orbit chosen for these satellites and on the number of these satellites (which may be increased until continuous coverage of the whole Earth is achieved).

Figure 5:
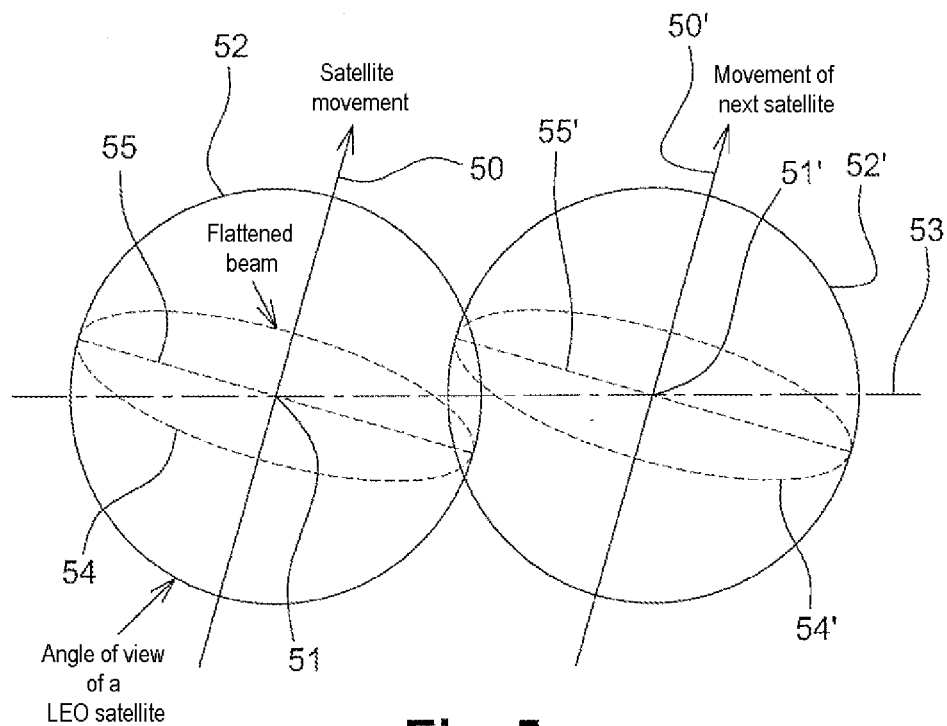
FIG. 5 is an illustration of the shape of the ground track for a flattened beam according to the invention.

FIG. 5 shows a line of movement 50 representing the vertical projection on the ground of the orbit of a first moving satellite (for example, a satellite placed in low orbit (LEO)), a parallel of the Earth being indicated by the line 53. At a given point 51 of its orbit, the satellite has an angle of view forming a conical beam, taking the form of a circle 52 on the ground.

A line of movement 50' is also shown, representing the vertical projection on the ground of the orbit of a second moving satellite of the same constellation, for example a moving satellite which is co-orbital with the first satellite considered. This second satellite also has an angle of view taking the form of a circle 52', at the point 51' of intersection of its orbit with the same parallel 53.

In order to provide calls to the user terminals on the ground, each moving satellite of the constellation has at least one antenna oriented toward the Earth's surface and adapted to allow calls from and to the surface terminals REC.

Each antenna creates a transmission/reception beam, the track of which on the Earth's surface forms the ground track 54, 54'. The method for determining the shape of the beams and their aiming direction is known to those skilled in the art of telecommunications satellites, and therefore will not be described further here.

FIG. 5 shows a configuration of the ground track 54, 54' of the moving satellite beam, used in an exemplary embodiment of the present invention, which enables the directivity to be increased using a single antenna beam per satellite (in broken lines).

As shown in FIG. 5, this ground track 54 is elliptical in this case, and is deliberately flattened in a direction perpendicular to the direction of movement of the moving satellite.

The width $l_f$ of this ground track 54, along an axis perpendicular to the line of movement 50 of the moving satellite, is called the "swath" 55 in the remainder of the description. When the moving satellite moves in its orbit, this swath 55 sweeps a strip on the ground resembling a swath in a field.

The ground track 54 is, for example but not necessarily, three times longer in the direction perpendicular to the direction of movement 50 of the moving satellite than in the direction parallel to the direction of movement of the moving satellite (referred to as the length direction). Clearly, this factor of three is given here purely by way of example. In the case of a single ground track formed by a single antenna, the elliptical track is such that its major axis is approximately three times greater than its minor axis.

Figure 6:
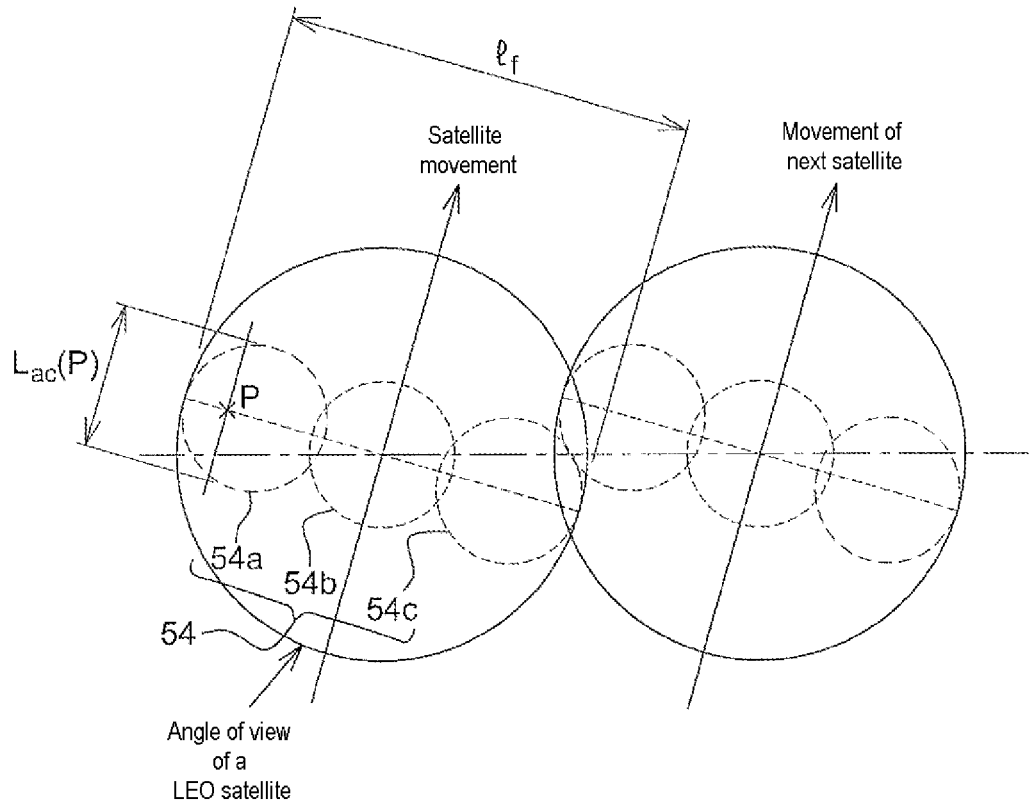
FIG. 6 is an illustration of the shape of the ground track of a swath of beams according to the invention.

In an alternative embodiment of the invention, shown in FIG. 6, a plurality of directional beams are deployed in the angle of view of the moving satellite. The antennas corresponding to these beams are positioned in the satellite in such a way as to minimize the complexity of the payload.

For this purpose, a certain number of narrow tracks 54a, 54b, 54c are created on the ground, forming for example, but not necessarily, an alignment perpendicular to the direction of movement of the moving satellite, as shown in FIG. 6 where the tracks appear in broken lines.

Thus the aggregate ground track 54 of the set of narrow tracks 54a, 54b, 54c of these beams forms a surface that is wider than it is long (according to the definitions of these terms given above).

Evidently, when a moving satellite passes, all the points in view of the swath 55 of this satellite are provided with a moment of communication with the satellite, and it is therefore essential to have the widest possible track, offering communication access to all points in view of the satellite.

However, the period of communication with the moving satellite may be short, because the transmission does not need to be permanent, but simply intermittent, for example in order to send a low-volume data packet at low speed. It would also be possible to send a large volume of data at high speed toward the moving satellite. Because of this requirement for an intermittent, non-permanent link, there is no need to maintain the communication between the satellite and the user terminal on the ground throughout the overflight of the user terminal by the moving satellite.

A short ground track, called the active communication length $L_{ac}(P)$, in the direction of movement of the moving satellite, is therefore enough to meet the requirement for intermittent communication at the point P.

Evidently, the active communication length $L_{ac}(P)$ is directly proportional to the duration of the overflight of the point P by an active antenna.

More generally, the link budget of the satellite is markedly improved because the mean value $MOY(L_{ac}(P))$ of this active communication length at all points of the swath 55 is markedly smaller than the width $l_f$ of this swath 55.

By way of example, for a constellation of LEO satellites in SSO orbit at an altitude of 680 km, the distance D between two tracks of moving LEO satellites (defined by the distance at the equator between the central lines of two consecutive swaths of satellites in the constellation) is approximately 685 km for 4 moving LEO satellites per plane (in other words, four satellites following each other in the same orbit) and 910 km for 3 moving LEO satellites per plane.

As shown in FIGS. 5 and 6, the moving satellite beams overlap slightly to ensure that user terminals located between two beams all have a minimum period of visibility of one or other of the moving satellites, this minimum being compatible with the predetermined quality requirements of the service.

By comparison with a solution in which there is a multiplicity of beams under the angle of view of the moving satellite, the payload of each moving satellite is much less complex. Furthermore, the reduction of the period of visibility of a moving satellite caused by the invention is compensated by an improved link budget, which constitutes a major advantage of the invention.

For example, in a first approximation, the power density received on the ground is proportional to the surface of the area covered, and therefore, if the total ground coverage represents one third of the complete area of view, the received power density is tripled, constituting a major advantage of the invention.

Additionally, the revisit time (the time between accessing two successive moving satellites for a user terminal on the ground) is not significantly affected in the case of fast moving satellites, as may be seen with LEO low-orbit satellites, for example.

The number of beams shown in FIG. 6 does not limit the invention. Indeed, a multiplicity of beams can be aligned so as to cover the swath.

FIG. 5 shows the distance D, measured in horizontal projection at the equator, between the lines of movement of moving satellites in the case of a constellation of space repeaters based on low-orbit satellites. It corresponds to the distance, measured along this parallel 53, between the points 51 and 51', when the parallel 53 in question is the equator.

The time ΔT between two equator crossing points of two moving satellites on the same orbital plane is given by the formula:

$$\Delta T = 2\pi \sqrt{\frac{a^3}{\mu}} * (\Omega 2 - \Omega 1)/2\pi$$

where $\Omega1$ and $\Omega2$ are the mean anomaly (in radians) of a first and a second satellite, a is the half major axis of the orbit, and $\mu$ is a constant equal to the product of the gravitational constant and the mass of the Earth.

The distance $\Delta T$ between two equator crossing points of two satellites in the same orbit is given by the formula:

$$D = \frac{2\pi \times \mathrm{Re} \times \Delta T}{86164} = \frac{2\pi \times \mathrm{Re} \times \sqrt{\frac{a^3}{\mu}} * (\Omega2 - \Omega1)}{86164}$$

This formula for calculating the distance D can be used to determine the smallest diameter of the beams of the swath for which the coverages of the moving satellites are contiguous. The table below shows the typical values for moving satellites traveling at an altitude of 680 km above the terrestrial surface and in orbits inclined at not less than 70°:

TABLE 1

Examples of numbers of beams and moving satellites per plane

|  | 3 satellites/plane | 4 satellites/plane |  |
|---|---|---|---|
| Mean anomaly | 2.094 | 1.571 | rad |
| T | 1,967 | 1,475 | s |
| D | 915 | 686 | km |
| Minimum angular extension (½ angle) of the swath of a satellite | 42 | 30 | ° |
| Minimum elevation at the intersection of the swaths | 42 | 56 | ° |
| Minimum beam diameter | | | |
| 3 beams per satellite | 341 | 242 | km |
| 4 beams per satellite | 254 | 181 | km |
| 5 beams per satellite | 202 | 144 | km |
| Angular extension of the beams | | | |
| 3 beams per satellite | 28 | 20 | ° |
| 4 beams per satellite | 21 | 15 | ° |
| 5 beams per satellite | 17 | 12 | ° |

This table clearly shows, for example, that for 3 moving satellites on the same orbital plane at an altitude of 680 km, (upper left-hand column), the difference between two satellite crossings is 1967 seconds (almost 33 minutes). Because of the rotation of the Earth in 24 hours (exactly one sidereal day, i.e. 86164 seconds), there is a difference D between the ground tracks of 915 km (the difference between two equator crossings of two successive moving satellites on the same orbital plane). In this case, in order to cover the whole ground surface lying between these tracks during at least one of the two crossings, it is simply necessary for the angular extension of the "swath" of each moving satellite to be 42° (fourth row of the table). In this case, the minimum elevation at which the moving satellite is observed from a user terminal is 42° (fifth row of the table).

As the number of satellites per plane increases, the minimum angular extension of the swath decreases.

As mentioned above, a slight overlap of the swaths is desirable in practice, to provide a satisfactory visibility time of the moving satellite for a surface user terminal REC (typically several tens of seconds).

In another embodiment (shown in FIG. 6), the device according to the invention combines a beam covering the whole angle of view 52 of the moving satellite with narrow beams 54a, 54b, 54c.

This arrangement has the advantage of allowing a choice to be made in a dynamic way between a requirement for total coverage in the high-latitude areas not covered by the geostationary satellites GEO (with a beam covering the whole angle of view of the moving satellite) and a requirement to improve directivity while retaining a simplified satellite architecture (narrow beams arranged according to the swath).

In a variant embodiment using a set of narrow beams forming ground tracks which move side by side to sweep the swath of the moving satellite, some of these beams may be arranged before the other beams, in the direction of movement of the moving satellite. This arrangement retains the widest possible total track with a short visibility time of each ground user terminal. Here again, therefore, an improved link budget is achieved, with intermittent communication with all the points of the satellite swath.

In the system described previously, or in the variant described above, at each point P on the ground of the swath 55 of the moving satellite, and in each orbit of the latter, the total coverage time (along the axis of movement) by at least one active antenna of the moving repeater means determines a length called the active communication length $L_{ac}(P)$ (along the axis of movement) which is markedly smaller than the width $l_f$ of said swath (along an axis perpendicular to the movement).

Evidently, the duration of the communication window is directly related to the length of coverage by an active antenna of the satellite.

In the previous part, an improvement of the link budget between a moving satellite and a user terminal on the ground was described. This improvement was obtained by reducing the communication time possible with each point P on the ground, during each orbit of the satellite. This reduction of the possible communication window is achieved while retaining a wide swath 55, of a predetermined width $l_f$, this width $l_f$ being related, notably, to the characteristics of the constellation of LEO satellites (namely the number of moving satellites located on the same orbital plane, the number of planes of the constellation, and the altitude of the satellites).

This reduction in duration was achieved, in the embodiment described above by way of non-limiting example, by a reduction of the length L of the ground track 54 of the beam or beams of the antennas of the satellite oriented toward the ground.

In other words, it will be clear that a user terminal on the ground sees a moving satellite above it during an overflight time related to the altitude of the orbit. An overflight time (for the passage from one horizon to the other) is approximately 13 minutes for a satellite traveling at an altitude of 680 km.

On the other hand, in the invention as described above by way of example, the antennas of the satellite create narrow beams which, in practice, only allow communication with the user terminal during a fraction of this overflight time. This time may vary from several tens of seconds to several minutes, approximately, depending on the configuration of the beams (the coverage area and angular extension of the beams). This time is satisfactory where there is only an intermittent link requirement.

In another embodiment, the reduction of the possible duration of communication with each user terminal on the ground is achieved by using a set of antennas installed on the satellite for ground communications, each of these antennas being energized for only part of the time.

The invention also relates to a method of controlling the energizing and de-energizing of the beams during the movement of the moving satellite.

This method may be used equally well in both the transmission and the reception channel, but it must be emphasized that the power consumption of a moving satellite is markedly greater in transmission than in reception.

According to the invention, the method comprises the following steps:
  100. Choose a beam to be energized
  200. Perform the necessary transmissions during a period called the energized period
  300. De-energize the beam
  400. Return to step 100

In step 100, the choice of a beam to be energized may be made in a regular manner, for example by energizing each beam for a third of the time, if the satellite has three antennas oriented toward the ground.

Alternatively, the choice of a beam to be energized may depend on the area which is overflown by the satellite, for example by giving the energizing of beams covering a land area priority over a beam covering a sea area.

In step 200, it should be noted that the duration of the energized period may be either fixed or variable according to a parameter or a combination of parameters to be defined.

For example, it is feasible for the energized period to be related to previously stored data on the call volume detected in each area on the ground during a previous period.

According to the method described here by way of example, only one beam is active at a time. This arrangement has the advantage of concentrating the power in one direction and providing an improved link budget based on the limited power budget of the moving satellite platform, or making it possible to have a smaller number of amplifiers on board.

Here again, each point P on the ground, and therefore each user terminal REC positioned in the swath 55 of the moving satellite, has at least one communication window with the moving satellite. However, the duration of this window is substantially smaller than the theoretical duration of the overflight of the user terminal by the moving satellite.

This is sufficient to meet a requirement for intermittent communication, and enables a very good link budget to be achieved.

In this case also, at each point P on the ground of the swath 55 of the moving satellite, and in each orbit of the latter, the total coverage time (along the axis of movement) by at least one active antenna of the moving repeater means determines a length called the active communication length $L_{ac}(P)$ (along the axis of movement) which is markedly smaller than the width $l_f$ of said swath 55 (along the axis perpendicular to the movement).

Evidently, the total communication time may be the sum of a plurality of times, when there are successive energizations of the antenna in view of the same point on the ground. In this case, the active communication length is the sum of the active communication lengths obtained during the successive energizations of antennas in view of the point P.

In the two embodiments described (that is to say, by using a plurality of antennas forming an aggregated ground track that is wider than it is long, or by successive energization of the antennas), at any instant of the orbit of the satellite, only a part of the theoretical ground coverage of the satellite is actually accessible for communications.

Advantages of the Invention

As a result of the combination of a constellation of LEO moving satellites (providing a higher-performance service in the polar regions) and a GEO constellation (providing a high-quality service in the equatorial regions and at low latitudes), the mean duration of non-visibility of a satellite for a user terminal is either zero or is greatly reduced by comparison with the prior art systems, notably when high angles of elevation are desired (in the case of mobile satellite communication, the signal blocking factor is reduced at a higher elevation, leading to better service availability).

Evidently, a system as described can offer markedly greater availability (as a result of the quasi-continuous coverage) for users who need to travel in remote areas which are poorly covered by conventional communications systems. This is the case, for example, in polar areas, where a constellation in polar (or quasi-polar) orbit may be used.

Furthermore, the arrangement and configuration of the beams as described in the invention enable the link budget to be increased while significantly reducing the complexity of the LEO satellite platforms used.

Other advantages of the chosen solution will become particularly clear when it is compared with the existing solutions using low-orbit satellites, geostationary satellites or hybrid constellations.

1/ Compared with a satellite communications solution using a constellation of low-orbit satellites, such as Orbcomm (registered trademark) or Argos (registered trademark), there are many advantages provided by the invention, as follows:
  There is no need to deploy linking stations for communications between the low-orbit LEO satellites and the terrestrial network infrastructure. This is because the linking station of the GEO satellite or satellites provides permanent access to the low-orbit LEO satellites.
  There is no need to deploy remote control/remote measurement and tracking (TTC) stations for the constellation of low-orbit satellites, as the TTC signals are also relayed by the GEO satellite or satellites. Evidently, the low-orbit satellites are tracked from the ground by the stationary satellite tracking stations via the GEO satellites.
  The design of the low-orbit satellites is markedly simplified (simplified orbital relay function). In the present invention, a further attempt has been made to simplify this architecture. It is advantageous to combine the increased directivity of the signal on the ground with simplification of the space repeater platforms.

2/ Compared with a satellite communications solution using a geostationary satellite, the advantages provided by the invention are as follows:
  An extension of the coverage of the geostationary satellite, to cover the polar areas for example.
  An improvement of the link budget performance, making it possible, for example, to miniaturize the user terminals, to reduce the power consumption of the terminals (less power required to meet the link budget, resulting in longer battery life for battery-powered terminals), or to improve speeds and availability.
  Reduced latency time for access to the network and for the acknowledgement of reception.

3/ Compared with a hybrid satellite telecommunications solution (forming part of the prior art) comprising one or more geostationary satellites and a constellation of low-orbit satellites, the advantages provided by the invention are as follows:
  The use of a common protocol between the two systems, more efficient than each protocol taken separately.
  Sharing of the frequency band used, with mechanisms to limit the intra-system interference.

Because of its design, the principle is particularly suited to user terminals having low directivity and not requiring the maintenance of aiming toward the low-orbit satellites. This is because the user terminal only needs to be aimed toward a GEO or LEO satellite in order to provide communication.

The possible applications relate to the improvement of future mobile geostationary satellite systems (MSS, for Mobile Satellite Services), including aeronautical mobile satellite services such as AMSS (Aeronautical Mobile Satellite Service) and AMSRS (Aeronautical Mobile Satellite Route Services), in the UHF, L, S, C or X band, based on the deployment of a low-orbit constellation which is much less complex than existing MSS constellations such as Globalstar (registered trademark) or Iridium (registered trademark), for machine-to-machine (M2M) voice or data communications or messaging.

This principle may also be applied to mobile data, television or radio satellite broadcasting systems (such as S-DAB radio broadcasting using a BSS allocation in the L band, or DVB-SH mobile television broadcasting using an MSS allocation in the S band).

Another use of this principle relates to data exchanges for navigation applications (of the marine or aeronautical type, notably). In these applications, known to those skilled in the art by the name SBAS (Satellite Based Augmentation System), there is as yet no way of covering the mobile terminals located in the vicinity of the poles. The invention enables this problem to be overcome with a satellite in geostationary orbit, and low-orbit satellite moving in view of the mobile terminal.

Similarly, within a service area of a geostationary satellite there are shadow areas for which the geostationary satellite is not directly in view of the surface terminals because of phenomena of masking by buildings or natural elements (trees, mountains, or the like). The coverage of a shadow area of these conventional communication devices may be possible because this area may come into the view of a moving satellite in low orbit.

Thus by using a telecommunications system or method according to the invention it is possible to extend the coverage area of communications means, including shadow areas, and notably to extend the coverage area of an SBAS system using a geostationary satellite.

If the space repeater transmits in a channel adjacent to that of the GEO satellite in a regenerative manner, a particular advantage of the invention relates to the possibility of simplifying the exchange protocols between the user terminals and the LEO satellites.

The LEO satellites can, notably, provide conversion to a specific exchange protocol for the GEO (in order to allow for propagation delay constraints specific to the GEO, for example), or message aggregation and optimization of bandwidth use.

A further important advantage of this principle is the possibility of providing a permanent, virtually real time link between the tracking and mission network and the constellation of LEO satellites, using the linking station and the GEO relay.

It will also be evident that the system does not necessarily require the deployment of a constellation of dedicated LEO or GEO satellites. This is because transmission capacity available in existing GEO satellite constellations can be used.

In this case, the frequency band of the GEO constellation used will naturally be chosen as the operating frequency band of the LEO satellites. This makes it possible to overcome the problem of the small number of frequency bands available for the mobile satellite services using non-geostationary satellites, and therefore is of regulatory interest for the deployment of a constellation of LEO satellites operating on a secondary basis in the same frequency band as the GEO satellite or satellites.

Similarly, the functions envisaged for LEO satellites may in fact be provided by means of the payloads carried as passengers on LEO satellites dedicated primarily to other functions. In this case, the decisive factor is the intended orbit of the LEO satellite. It is advantageous to choose Earth observation satellites, which frequently use a highly inclined heliosynchronous orbit, and therefore cover high latitudes.

This use of payloads as passengers is, naturally, very advantageous in terms of the cost of deployment of the system.

The system described here thus provides a simple and economical solution by comparison with other possible alternatives such as:

1. The deployment of a large number of ground stations to offer a permanent link between the LEO satellites and the ground, which is a costly solution and difficult to implement, particularly for coverage of the oceans (the Globalstar (registered trademark) constellation is a good illustration of this difficulty); and 2. The use of inter-satellite links to provide a permanent link between the LEO satellites and a limited number of ground stations. This solution has the drawback of increasing the complexity and cost of the space segment (the Iridium constellation is a good illustration of this solution).

Finally, the arrangement and configuration of the beams as described in the invention makes it possible to reduce the cost of the system and terminals and to improve their performance, as follows:

The increase in the link budget makes it possible to increase the miniaturization of the terminals and/or to reduce their transmission power. This rise in the link budget could also be used to increase the speeds offered by the system.

The significant reduction of the complexity of the LEO moving satellite platforms used makes it possible to reduce their price or increase the number of satellites deployed in the system.

The advantages obtained from the shape of the aggregate beam include a reduction in electromagnetic emissions on the ground as well as a reduction in the interference capacity.

Variants of the Invention

In a variant of the method, the sequence of activated antennas follows a sweep in one direction before returning to the starting beam when the last beam of the swath has been de-energized.

In another variant of the method, the sequence of activated beams alternates between the widest beam (covering the angle of view of the satellite) and the narrower beams. Thus, the widest beam can be used over the polar areas, while the swath of more directional beams can be used in the rest of the geostationary satellite coverage.

The invention claimed is:

1. A telecommunications system for intermittent data transfer from and to at least one user located substantially on the surface of a celestial body, the telecommunications system comprising:
   at least one surface transmitter/receiver terminal associated with each user;
   one or more moving signal repeaters to repeat signals transmitted to or received from the surface terminals, the repeaters moving above the surface of the celestial body, each moving repeater having at least one antenna oriented toward the surface of the celestial body, and configured to allow communications from and to surface terminals, each antenna producing a transmission/reception beam, a track of which on the surface of the celestial body forms a ground track, the progressive sweeping of the surface by the ground track forms a strip called a swath; and an active track length reduction device, configured to ensure that, at each point P of the swath of the moving repeater, and on each pass of the latter, a total coverage time along a line of movement by at least one active antenna of the moving repeater determines a length $L_{ac}(P)$ called the active communication length, whose mean value $L_{ac}$ over a width of the swath is smaller than the width $l_f$ of said swath along an axis perpendicular to the line of movement.

2. The telecommunications system as claimed in claim 1, wherein the active track length reduction device comprise, for at least one moving repeater, antennas oriented toward the ground, the beams of which are such that a length of each beam on the ground, equal to the active communication length $L_{ac}$, is smaller than the width $l_f$ of the swath along the axis perpendicular to the movement.

3. The telecommunications system as claimed in claim 2, wherein an aggregate ground track of a set of transmission/reception beams of the moving repeater has a length, measured in a direction of movement of the moving repeater, which is less than its width $l_f$, measured in a direction perpendicular to the direction of movement of the moving repeater.

4. The telecommunications system as claimed in claim 3, wherein the width $l_f$ of the aggregate ground track is greater than or equal to three times the length of said ground track.

5. The telecommunications system as claimed in claim 2, wherein the moving repeater has an antenna whose beam forms an elliptical ground track having a width $l_f$ greater than its length.

6. The telecommunications system as claimed in claim 2, wherein the moving repeater has at least two antennas whose beams sweep adjacent areas of the swath, the aggregate ground track of the tracks of each beam having a width $l_f$ greater than its length.

7. The telecommunications system as claimed in claim 1, wherein the active track length reduction device comprise, for at least one moving repeater, at least two antennas oriented toward the ground, and a device for intermittently energizing each of these antennas.

8. A telecommunications method for intermittent data transfer from and toward at least one user located substantially on the surface of a celestial body, the user being provided with a user terminal, in view of at least one moving repeater moving above the surface of the celestial body, the method comprising, in an iterative manner, the steps of:

selecting at least one antenna of a moving signal repeater of a telecommunications system to be energized or activated, the telecommunications system comprising one or more moving signal repeaters moving above the surface of the celestial body, each moving signal repeater is configured to repeat signals transmitted to or received from user terminals and comprises said at least one antenna oriented toward the surface of the celestial body and configured to allow communications from and to the user terminals;

transmitting from or toward the user terminal of the user during an illumination period, said at least one energized antenna of the moving signal repeater is configured to produce a transmission/reception beam, a track of which on the surface of the celestial body forms a ground track, the progressive sweeping of the surface by the ground track forms a strip called a swath;

ensuring, by an active track length reduction device that at each point P of the swath of the moving signal repeater and on each pass of the latter, a total coverage time along a line of movement by said at least one energized antenna of the moving signal repeater determines a length $L_{ac}(P)$ called the active communication length, whose mean value $L_{ac}$ over a width of the swath is smaller than the width $l_f$ of said swath along an axis perpendicular to the line of movement; and de-energizing said at least one energized antenna.

9. The telecommunications method as claimed in claim 8, further comprising the step of selecting a beam to be energized in a regular manner during a time proportional to a number of antennas oriented toward the ground.

10. The telecommunications method as claimed in claim 8, further comprising the step of selecting a beam to be energized depending on the area being over flown by a satellite, according to a predetermined logic which is dependent on a type of area over flown.

11. The telecommunications method as claimed in claim 8, further comprising the step of varying a duration of an energized period according to a predetermined criterion.

12. The telecommunications method as claimed in claim 11, wherein the energized period is related to previously stored data on a call volume detected in each area on the ground during a previous period.

13. The telecommunications method as claimed in claim 8, further comprising the step of energizing only one antenna at a time.

14. The telecommunications method as claimed in claim 8, wherein a sequence of activated antennas follows a sweep in a predetermined direction before returning to a starting antenna when a last antenna of the swath has been energized.

15. The telecommunications method as claimed in claim 8, wherein a sequence of activated antennas alternates between a wide antenna covering a whole angle of view of a satellite and antennas providing narrower beams.

16. The telecommunications method as claimed in claim 8, further comprising the steps of utilizing a widest beam when the moving repeater is located above polar areas of the celestial body, and utilizing the antennas providing narrower beams in the rest of the trajectory of the moving repeater.

* * * * *